(12) United States Patent
Lecole et al.

(10) Patent No.: US 7,681,546 B2
(45) Date of Patent: Mar. 23, 2010

(54) DEVICE FOR CONTROLLING AN AUTOMATIC START/STOP SYSTEM

(75) Inventors: Brice Lecole, Paris (FR); Magali Laurence, Paris (FR)

(73) Assignee: Valeo Equipements Electriques Moteur, Creteil (FR)

( * ) Notice: Subject to any disclaimer, the term of this patent is extended or adjusted under 35 U.S.C. 154(b) by 376 days.

(21) Appl. No.: 11/575,767

(22) PCT Filed: Sep. 22, 2005

(86) PCT No.: PCT/FR2005/002355

§ 371 (c)(1),
(2), (4) Date: Mar. 22, 2007

(87) PCT Pub. No.: WO2006/032795

PCT Pub. Date: Mar. 30, 2006

(65) Prior Publication Data

US 2008/0060601 A1 Mar. 13, 2008

(30) Foreign Application Priority Data

Sep. 23, 2004 (FR) .................................. 04 10091

(51) Int. Cl.
*F02N 17/00* (2006.01)
(52) U.S. Cl. .................................. 123/179.3; 123/179.4
(58) Field of Classification Search ............... 123/179.3, 123/179.4
See application file for complete search history.

(56) References Cited

U.S. PATENT DOCUMENTS

| 4,381,042 | A | | 4/1983 | Perry | |
|---|---|---|---|---|---|
| 4,485,772 | A | * | 12/1984 | Uchida et al. | 123/179.4 |
| 4,721,872 | A | * | 1/1988 | Simmons | 123/179.3 |
| 6,371,889 | B1 | | 4/2002 | Kuroda et al. | |
| 6,532,926 | B1 | * | 3/2003 | Kuroda et al. | 123/179.4 |
| 6,817,329 | B2 | * | 11/2004 | Buglione et al. | 123/179.4 |
| 7,143,732 | B2 | * | 12/2006 | Watanabe et al. | 123/179.4 |
| 7,146,959 | B2 | * | 12/2006 | Thompson et al. | 123/179.4 |
| 7,210,443 | B2 | * | 5/2007 | Shimokawa | 123/179.4 |
| 2004/0089258 | A1 | * | 5/2004 | Buglione et al. | 123/179.4 |
| 2005/0066943 | A1 | * | 3/2005 | Tanaka et al. | 123/179.4 |
| 2006/0011163 | A1 | * | 1/2006 | Watanabe et al. | 123/179.4 |

FOREIGN PATENT DOCUMENTS

| EP | 1 059 441 A2 | 12/2000 |
|---|---|---|
| EP | 1 469 195 A1 | 10/2004 |

* cited by examiner

*Primary Examiner*—Stephen K Cronin
*Assistant Examiner*—Arnold Castro
(74) *Attorney, Agent, or Firm*—Jacox, Meckstroth & Jenkins

(57) ABSTRACT

A device for controlling the operating state of a system for the automatic starting/stopping of a heat engine of a vehicle. The invention is characterized in that the device comprises at least one operating state indicator (F1, F2) which is associated with an operating mode of the system and which can adopt a first position (B1, P1) in an operating mode inhibition state, a second position (B2, P2) in an operating mode activation state and a third position (B3, P3) in an operating mode intermediate state.

11 Claims, 1 Drawing Sheet

DEVICE FOR CONTROLLING AN AUTOMATIC START/STOP SYSTEM

BACKGROUND OF THE INVENTION

1. Field of the Invention

The present invention concerns a device for controlling the operating state of an automatic starting/stopping system for a thermal engine of a motor vehicle.

The invention finds a particularly advantageous application in the field of the automotive industry, and more especially in that of vehicles equipped with an automatic starting/stopping system, such as the system known by the English term "Stop and Go".

2. Description of the Related Art

Vehicles able to function according to "Stop and Go" mode are equipped with a reversible electrical machine, or alternator/starter, coupled to the thermal engine, by means of a belt for example. In general terms, a reversible electrical machine of a vehicle combines two distinct functions, namely on the one hand the conventional function of alternator when the shaft of the thermal engine drives the rotor of the machine so as to produce an electric current at the stator and on the other hand the starter function when conversely a current applied to the stator of the machine causes the rotor to start to rotate, which then drives the shaft of the thermal engine in a similar manner to a conventional starter.

The application of an alternator/starter to the "Stop and Go" operating mode consists, under certain conditions, of causing the complete stoppage of the thermal engine when the vehicle is itself at rest, and then restarting the thermal engine following for example an action by the driver interpreted as a request for restarting. A typical situation with "Stop and Go" is that of stopping at a red light. When the vehicle stops at the light, the thermal engine is automatically stopped and then, when the light becomes green, the engine is restarted in particular by means of the alternator/starter following the detection by the vehicle starting control system of the pressing of the clutch pedal by the driver or any other action that may be interpreted as the intention of the driver to restart his vehicle. The advantage of the "Stop and Go" mode in terms of energy saving and pollution reduction, in particular in an urban environment, will be understood.

It is however necessary to emphasize that the functioning of such an automatic starting/stopping system is in general relatively complex because in particular of the implementation of many conditions that must be verified before any decision on automatic starting or stopping is taken, and because of the existence of intermediate operating modes, such as degraded modes, to which the system is subject under certain circumstances.

However, the decisions relating to automatic starting or stopping are by hypothesis made by the system unknown to the driver. The latter is therefore in total ignorance of the unfolding of the actions controlled by the automatic starting and stopping system concerning the functioning of the thermal engine of his vehicle, while, for reasons of safety and driving pleasure, he should be informed of this as precisely as possible.

SUMMARY OF THE INVENTION

An object of the present invention is precisely to propose means enabling the driver of a vehicle having a system of the "Stop and Go" type to be kept informed of the operating state of the system.

This object is achieved, in accordance with the present invention, by virtue of a device for informing a driver of a vehicle equipped with an automatic starting/stopping system for a thermal engine of the vehicle, characterized in that the information device comprises at least one state indicator associated with an operating mode of the said system, able to adopt a first position in a state of inhibition of the operating mode, a second position in a state of activation of the operating mode, a third position in an intermediate state of the operating mode.

This arrangement has the advantage of enabling the driver not only to know whether the automatic starting/stopping system is in operation or not, but also to be informed of a functioning of the system according to an intermediate mode which, according to the application, may correspond for example to operating in degraded mode of the system or correspond to an operating state belonging to a phase of preparation for the stoppage of the automatic starting/stopping device.

The description that follows with regard to the single FIGURE, given by way of non-limiting example, will give a clear understanding of what the invention consists and how it can be implemented.

DETAILED DESCRIPTION OF PREFERENTIAL EMBODIMENTS OF THE INVENTION

Figure 1:
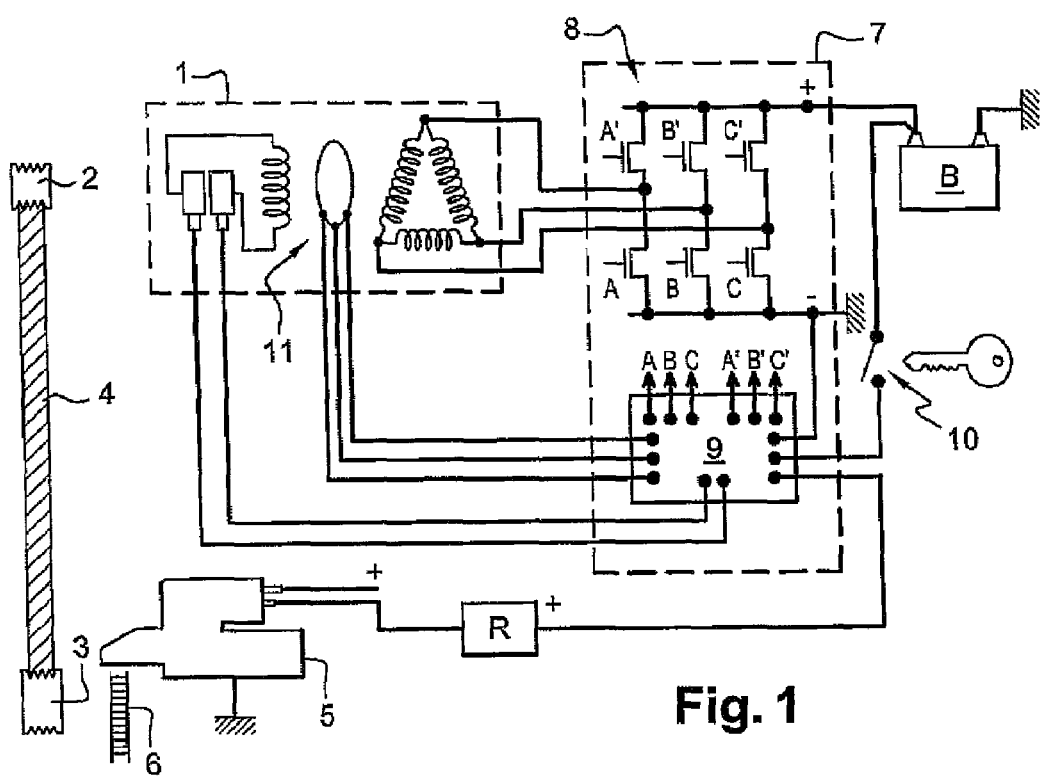
FIG. 1 is a diagram of an automatic starting/stopping system for a thermal engine of a vehicle.

FIG. 1 depicts an automatic starting/stopping system for a thermal engine of a vehicle, in particular the "Stop and Go" system mentioned above. In the remainder of the description, reference will be made to a vehicle equipped with a reversible electrical machine, such as an alternator/starter, controlled according to the methods of the "Stop and Go" system. Naturally any other electrical machine, reversible or not, could be used in the context of the invention.

The system of FIG. 1 comprises:

- a separate alternator/starter 1 comprising a shaft terminating in a pulley 2 that is connected to a pulley 3 of the crankshaft of the thermal engine by means of a belt 4. This alternator/starter is mounted in the place that the alternator normally occupies;
- optionally, an additional conventional starter 5 with pinion is able to mesh with the teeth on a ring 6 in order to drive the shaft of the thermal engine;
- control electronics 7.

The control electronics 7 comprise:

- a transistor bridge 8 that constitutes a reversible power converter and that provides control in starter mode and preferably synchronous rectification in alternator mode;
- a control module 9 that controls the various transistors of the converter 8 and in particular manages the following various functions:
  - power in starter and alternator modes
  - regulation in alternator mode
  - transition from starter mode to alternator mode
  - operating strategy.

The control module 9 is for this purpose supplied with the voltage of the battery, referenced B, to which it is connected by means of an ignition switch 10 of the vehicle.

It receives as an input information enabling it to determine the angular position of the rotor of the alternator/starter 1, for example information supplied by sensors 11, such as Hall effect sensors.

At its output, it supplies a field winding of the alternator/starter 1, as well as the starter 5, and generates the voltages injected onto the gates (A, B, C; A', B', C') of the transistors of the bridge 8.

In addition, the control module 9 receives information coming from measurement and detection sensors distributed in the vehicle, such as temperature measurement sensors (cabin, electronic circuits, etc) and sensors detecting the position of various components (clutch pedal, brake pedal, gear lever, etc). Moreover, the module 9 also receives data relating to the functioning of the vehicle supplied by a communication bus of the vehicle (engine control, speed of vehicle, speed of engine, etc).

All the information and data received by the control module 9 are processed so as to define a certain number of operating modes of the automatic starting/stopping of the thermal engine.

Among these operating modes, the actuation or not of the system can be cited, which is characterized by three states: an inhibition state corresponding to a "stop" position of the system, an activation state corresponding to a "running" position of the system and an intermediate state called "degraded" mode in which the system in the "running" position does not fulfil all the functionalities provided because of certain malfunctionings, such as the absence of communication with the CAN bus or the absence of information coming from the sensors. With each of the states relating to the actuation of the automatic starting/stopping system that have just been presented, there is associated a position of a state indicator, such as for example an indicator light present in the vehicle cabin in order to inform the driver accordingly.

In a first application of the invention, the operating mode concerns the actuation of the automatic starting/stopping system S1.

More precisely, the automatic starting/stopping S1 can comprise, in its actuation, three states, namely
 a first state of inhibition of the functioning of the system S1
 a second state of activation of functioning of the system S1
 a third state of degraded functioning of the system S1.

This actuation of the automatic starting/stopping system S1 of the thermal engine is effected for example by means of a knob B where
 a position B1 corresponds to an inactive mode of the system S1
 a position B2 corresponds to an active mode of the system S1.

The change to a state B3 corresponding to the degraded operating mode of the system takes place automatically when a predetermined operating condition is not in accordance with a nominal functioning.

Thus, in degraded mode, the system S1 may:
 have lost its starting/stopping functionality
 no longer be in a position to perform an automatic stopping.

For each of these positions, a control device enables the driver to know the state of the automatic starting/stopping system.

To this end, a state indicator F1 is provided. By way of example, if it is a case of a visual or audible indicator, according to the state of actuation of S1, this indicator may be configured in the following way:
 the state indicator F1 is continuously active ON if the system S1 is inactive B1;
 the state indicator F1 is inactive OFF if the system S1 is active;
 the state indicator F1 is intermittent ON/OFF if the system S1 is in degraded mode.

In a variant the state indicator is continuously active in degraded mode if for example the degraded mode corresponds to the loss of the starting/stopping function of the system S1. This case, from a functional point of view, corresponds to the position B1 of the knob which inhibits the starting/stopping function of the system S1.

In the case where the state indicator F1 is an indicator light, then
 the ON state of F1 corresponds to a continuous activation of the indicator light
 the OFF state of F1 corresponds to a deactivation of the indicator light
 the ON/OFF state of F1 corresponds to an intermittent activation of the indicator light, that is to say a blinking of the indicator light. Several blinking modes can be envisaged corresponding to various possible degraded operating modes of the system S1.

In practical terms, the indicator light that informs the driver of the operating state of the system S1 can be integrated in the knob B.

In a similar manner the state indicator can be an audible signal that can be activated, deactivated or activated discontinuously.

According to another embodiment, the indicator for the state of functioning of the "Stop and Go" system S1 can consist of a display that clearly indicates the state of the system S1 in text or symbol language.

Table T1 below summarises the various operating modes of this first application.

TABLE T1

|  | B1 | B2 | B3 |
|---|---|---|---|
| S1 | INACTIVE | ACTIVE | DEGRADED |
| F1 | ON | OFF | ON/OFF ON |

The two tables T2, T3 below show the state of the state indicator F1 depending on whether the ignition key of the motor vehicle is in the inactive position +APC OFF or in the active position +APC ON, the latter position corresponding to the powering up of the on-board system of the motor vehicle.

The second table T2 corresponds to a nominal functioning of the system S1. When the ignition key is inactive the state indicator is inactive. When the ignition key is activated, then the state indicator F1 positions itself according to the state of the knob B.

If the system S1 is activated (position B2 of the knob B) then the state indicator F1 is inactive OFF.

If the system S1 is deactivated (position B1 of the knob B) then the state indicator F1 is inactive ON.

Nominal mode:

TABLE T2

|  | +APC OFF | +APC ON |
|---|---|---|
| B1 S1 INACTIVE | F1 OFF | F1 ON |
| B2 S2 ACTIVE | F1 OFF | F1 OFF |

The third table T3 corresponds to a degraded functioning of the system S1. When the ignition key is inactive the state indicator is inactive. When the ignition key is activated, then the state indicator F1 positions itself according to the state of the knob B.

If the system S1 is activated (position B2 of the knob B) then the state indicator F1 is intermittent ON/OFF.

If the system S1 is deactivated (position B1 of the knob B) then the state indicator F1 is inactive ON.

Degraded mode:

TABLE T3

|  | +APC OFF | +APC ON |
|---|---|---|
| B1 S1 INACTIVE | F1 OFF | F1 ON |
| B2 S2 ACTIVE | F1 OFF | F1 ON/OFF |

In a second application of the invention, the operating mode concerns the automatic stopping of the automating starting/stopping system.

In particular, provision is made by the invention for the state indicator F2 to be in the first position P1 in a state of inhibition of an automatic stopping phase, second position P2 in a state of activation of an automatic stopping, the third position P3 in a state of preventing an automatic stopping.

In this way, the driver of the vehicle has the possibility of receiving a signal warning him of a probable stopping of the thermal engine by the automatic starting/stopping system in addition to information concerning the entry or not into an actual stopping phase.

One embodiment of this second application of the invention consists of the first position P1 of the state indicator F2 being in an "inactive" position, the second position P2 an "active" position, the third position P3 an "intermittent" position.

As indicated previously, the indicator may be audible, visual or textual.

By convention, the three positions P1, P2 and P3 belong to the phase of preparation of the automatic stopping of the system S1.

The system S1 is in the first position P1 when not all the so-called steady conditions are satisfied. The automatic stopping process is not yet triggered and the system is not yet in the phase of preparing automatic stopping.

The so-called steady conditions are substantially stable during the execution of a stop instruction. These are all the conditions necessary for enabling the triggering of an automatic stopping.

The system S1 is in the second position P2 when all the so-called steady and variable conditions are satisfied. The automatic stopping process is then triggered.

The so-called variable conditions are liable to change during the execution of the stopping instruction. For example, it may be a case of a charging state of the battery or the temperature of the thermal engine.

The system S1 then transmits the stop instruction for example to the thermal engine control unit, which will proceed with the stopping of the thermal engine.

By convention, this phase of transmission of the stop instruction corresponds to the stop phase and follows on from the stopping preparation phase described above.

During this stop phase, the state indicator F2 is active.

Preferably, during this stop phase, the system S1 continually tests the so-called steady conditions so as to enable starting of the "reflex" type before the actual stopping of the thermal engine.

The system S1 is in the third position P3 when all the so-called steady conditions are satisfied and at least one variable condition is not satisfied. Under these conditions, the stop phase cannot be initiated.

During this phase of preparation of the automatic stopping, the state indicator F2 is active intermittently in order to indicate that the system S1 cannot initiate the automatic stopping process because of at least one variable condition that does not satisfy the required conditions.

Naturally, the various positions of the state indicators F1, F2 are relative, an active position ON of this state indicator being able to correspond to a switched-on or switched-off state in the case for example where the state indicator is an indicator light.

While the form of apparatus herein described constitute a preferred embodiment of this invention, it is to be understood that the invention is not limited to this precise form of apparatus, and that changes may be made therein without departing from the scope of the invention which is defined in the appended claims.

What is claimed is:

1. An automatic starting/stopping system for an engine in a vehicle operated by a driver, comprising:

a) apparatus which (i) shuts down the engine when the vehicle stops and (ii) re-starts the engine when the driver calls for resumed motion;

b) a control module (9) which ascertains whether the apparatus is either (i) functioning properly or (ii) operating in a degraded mode in which the apparatus cannot shut down the engine when the vehicle stops; and c) an indicator, visible to the driver, which is actuated when the control module ascertains the degraded mode to be present.

2. A system according to claim 1, in which, when the degraded mode is not present, the indicator assumes either i) a first state which indicates that the apparatus is active, and will shut down the engine when the vehicle stops; or ii) a second state which indicates that the apparatus is not active, and will not shut down the engine when the vehicle stops.

3. An automatic starting/stopping system for an engine in a vehicle operated by a driver, comprising:

a) apparatus which (1) shuts down the engine when the vehicle stops and (2) re-starts the engine when the driver calls for resumed motion:

b) an indicator, which is visible or audible to the driver, and which assumes either i) a first state which indicates that the apparatus is active, and will shut down the engine when the vehicle stops;

ii) a second state which indicates that the apparatus is not active, and will not shut down the engine when the vehicle stops; or iii) a third state which indicates that the apparatus is not active, and will not shut down the engine when the vehicle stops, and cannot be made active to shut down the engine when the vehicle stops.

4. A device for controlling the operating state of an automatic starting/stopping system (S1) for a thermal engine of a vehicle, said device comprising at least one operating state indicator (F1, F2) able to selectively adopt:

a) a first position (B1, P1) indicating that said device is active and will automatically stop said thermal engine, b) a second position (B2, P2) indicating that said device is non-active, and will not automatically stop said thermal engine, or c) a third position (B3, P3) which is an intermittent position in a state of degrading function of said system;

wherein said at least one operating state indicator is on during each of said first, second and third positions.

5. The device according to claim 4, wherein an operating mode concerns the actuation of said automatic starting/stopping system (S1).

6. The device according to claim 5, wherein said at least one operating state indicator (F1) is in said first position in a state of inhibition of the functioning of said system, in the second position in a state of activation of the functioning of said system, and in the third position in a state of degraded functioning of said system.

7. The device according to claim 5, wherein said first position is an "ACTIVE" position (ON), the second position is an "INACTIVE" position (OFF), and the third position an "INTERMITTENT" position (ON/OFF).

8. The device according to claim 4, wherein an operating mode concerns the automatic stopping of said automatic starting/stopping system.

9. The device according to claim 8, wherein said at least one operating state indicator (F2) is in said first position (P1) in a state of inhibition of an automatic stop phase, in said second position (P2) in a state of activation of an automatic stopping, and in said third position (P3) in a state of preventing automatic stopping.

10. The device according to claim 9, wherein said first position is an "INACTIVE" position, the second position an "ACTIVE" position, and the third position an "INTERMITTENT" position.

11. An automatic starting/stopping system in a vehicle, which automatically stops an engine in the vehicle when the vehicle stops, and automatically re-starts the engine for resumption of movement of the vehicle, comprising:

a) an operating mode indicator which, at all times, indicates one of the following three states:

i) an active state in which the system will stop the engine when the vehicle stops, ii) an inactive state in which the system will not stop the engine when the vehicle stops, and iii) a degraded state in which the system cannot enter the active state.

* * * * *